United States Patent
Liu et al.

(10) Patent No.: US 12,001,373 B2
(45) Date of Patent: Jun. 4, 2024

(54) DYNAMIC ALLOCATION OF PERIPHERAL COMPONENT INTERCONNECT EXPRESS BUS NUMBERS

(71) Applicant: Dell Products L.P., Round Rock, TX (US)

(72) Inventors: Wei G. Liu, Austin, TX (US); Alberto D. Perez Guevara, Pflugerville, TX (US); Sanjeev Singh, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 17/842,384

(22) Filed: Jun. 16, 2022

(65) Prior Publication Data

US 2023/0409505 A1    Dec. 21, 2023

(51) Int. Cl.
*G06F 13/42* (2006.01)
*G06F 9/50* (2006.01)

(52) U.S. Cl.
CPC ........ *G06F 13/4221* (2013.01); *G06F 9/5044* (2013.01); *G06F 2213/0026* (2013.01)

(58) Field of Classification Search
CPC .............. G06F 13/4221; G06F 9/5044; G06F 2213/0026
See application file for complete search history.

(56) References Cited

U.S. PATENT DOCUMENTS

| | | | |
|---|---|---|---|
| 10,936,326 B2 | 3/2021 | Castillo et al. | |
| 11,157,427 B2 | 10/2021 | Leyendecker et al. | |
| 2007/0011383 A1* | 1/2007 | Berke | G06F 13/4022 710/301 |
| 2009/0204736 A1* | 8/2009 | Xie | G06F 13/4221 710/301 |
| 2009/0327682 A1 | 12/2009 | Liu | |
| 2018/0341497 A1 | 11/2018 | Perez Guevara | |
| 2018/0349188 A1* | 12/2018 | Beckett | G06F 13/4282 |
| 2020/0019412 A1* | 1/2020 | Grande | G06F 13/4081 |
| 2020/0394076 A1 | 12/2020 | Chan et al. | |
| 2022/0092015 A1* | 3/2022 | Hung | G06F 13/4221 |
| 2023/0240036 A1* | 7/2023 | Chuang | H05K 7/1418 361/679.02 |

* cited by examiner

*Primary Examiner* — Glenn A. Auve
(74) *Attorney, Agent, or Firm* — Larson Newman, LLP

(57) ABSTRACT

An information handling system may detect whether each one of a plurality of peripheral component interconnect express (PCIe) slots is populated or unpopulated, and update a PCIe bus configuration map to indicate whether each of the PCIe slots is populated. The system may also allocate PCIe bus resources to each of the PCIe slots based on the PCIe bus configuration map, wherein the allocating of the PCIe bus resources includes prioritizing populated PCIe slots over unpopulated PCIe slots.

20 Claims, 3 Drawing Sheets

DYNAMIC ALLOCATION OF PERIPHERAL COMPONENT INTERCONNECT EXPRESS BUS NUMBERS

FIELD OF THE DISCLOSURE

The present disclosure generally relates to information handling systems, and more particularly relates to dynamic allocation of peripheral component interconnect express (PCIe) bus numbers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may detect whether each one of a plurality of peripheral component interconnect express (PCIe) slots is populated or unpopulated, and update a PCIe bus configuration map to indicate whether each of the PCIe slots is populated. The system may also allocate PCIe bus resources to each of the PCIe slots based on the PCIe bus configuration map, wherein the allocating of the PCIe bus resources includes prioritizing populated PCIe slots over unpopulated PCIe slots.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
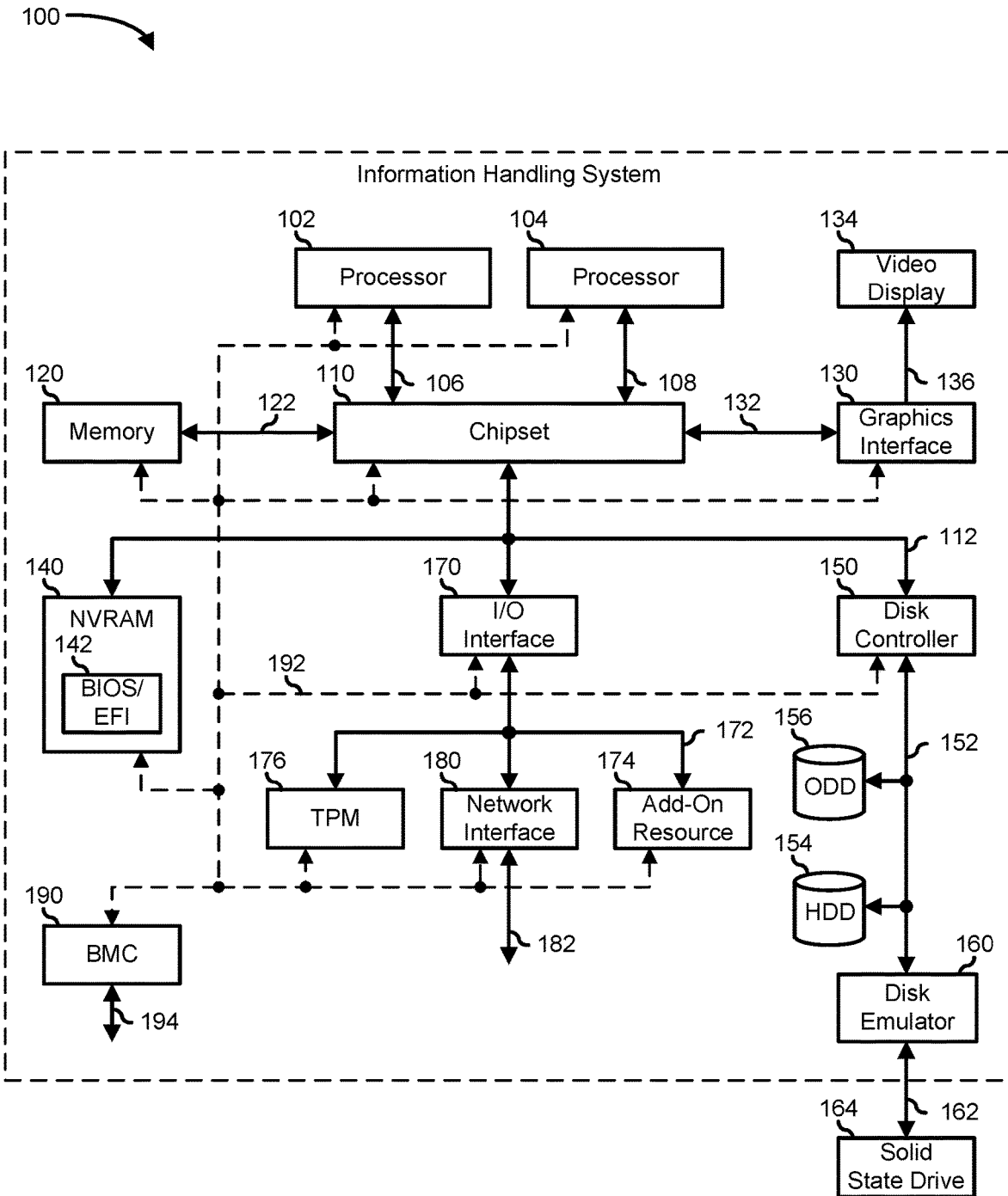
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, provide drivers for the resources, initialize the resources, and provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Typically, information handling systems include PCIe interfaces and ports for connecting and communicating with PCIe compatible devices. In some information handling systems, a number of PCIe slots may be included in the system motherboard, along with one or more processing devices, such as a platform controller hub (PCH), and other hardware components. Each PCIe slot included on the motherboard may be configured to receive a PCIe card that includes one or more PCIe devices. Examples of PCIe devices include video cards, sound cards, non-volatile memory cards, network interface cards, solid-state drives, graphics processing units (GPUs), etc.

In the PCIe bus architecture, PCIe devices are connected through a network of serial connections called links or PCIe bus resources, also referred herein as PCIe buses or simply buses, wherein each bus is assigned a bus number. A PCIe link or bus is a point-to-point communication channel between two PCIe ports and includes one or more lanes. For example, there could be one, four, eight, twelve, sixteen, or thirty-two lanes. Each lane is composed of two differential signal pairs, one for receiving data and the other for transmitting data. Accordingly, PCIe slots and PCIe cards can be configured with one, four, eight, twelve, sixteen, or thirty-two lanes.

During the boot process the BIOS is responsible for PCIe enumeration, which includes assigning bus numbers for each PCIe device discovered including root ports, switches, and endpoints. This provides system software, such as the operating system, a device driver, a software application, etc. an enumerated way to address PCIe devices. Typically, allocation of the bus numbers is performed before the BIOS is aware of the actual installed PCIe devices.

In one example an I/O controller, such as Intel s Integrated I/O controller (IIO), utilizes an I/O stack to connect a PCIe bus to the mesh domain. Typically the BIOS allocates the bus numbers more or less uniformly for each I/O stack, referred to herein simply as a stack. In one example, thirty-two bus numbers may be allocated per stack and one hundred twenty-eight bus numbers may be allocated per socket. This allocation typically works until an increasing number of PCIe devices that require more than thirty-two buses are used which exceeds the typical allocation and causes the boot process to fail. This is because even though other PCIe slots are not using all their bus allocations, the BIOS doesn't have the means to reallocate the bus numbers.

Some users determine a list of PCIe slots that may be used for PCIe devices that may not be accommodated with the typical allocation of bus numbers. This list may be provided to the manufacturer of the information handling system. Based on the list, the manufacturer may customize the BIOS to allow the customer to allocate more buses for the PCIe slots to accommodate these PCIe devices. However, this is a manual workaround that is not sustainable for the customer and manufacturer. Also, customers typically do not want customized BIOS as it may be difficult to maintain. For example, the customized BIOS may be updated each time the customer changes its PCIe device, or a new BIOS is released. Thus, it is desirable for a system or method that allows the BIOS to allocate the bus numbers automatically.

Figure 2:
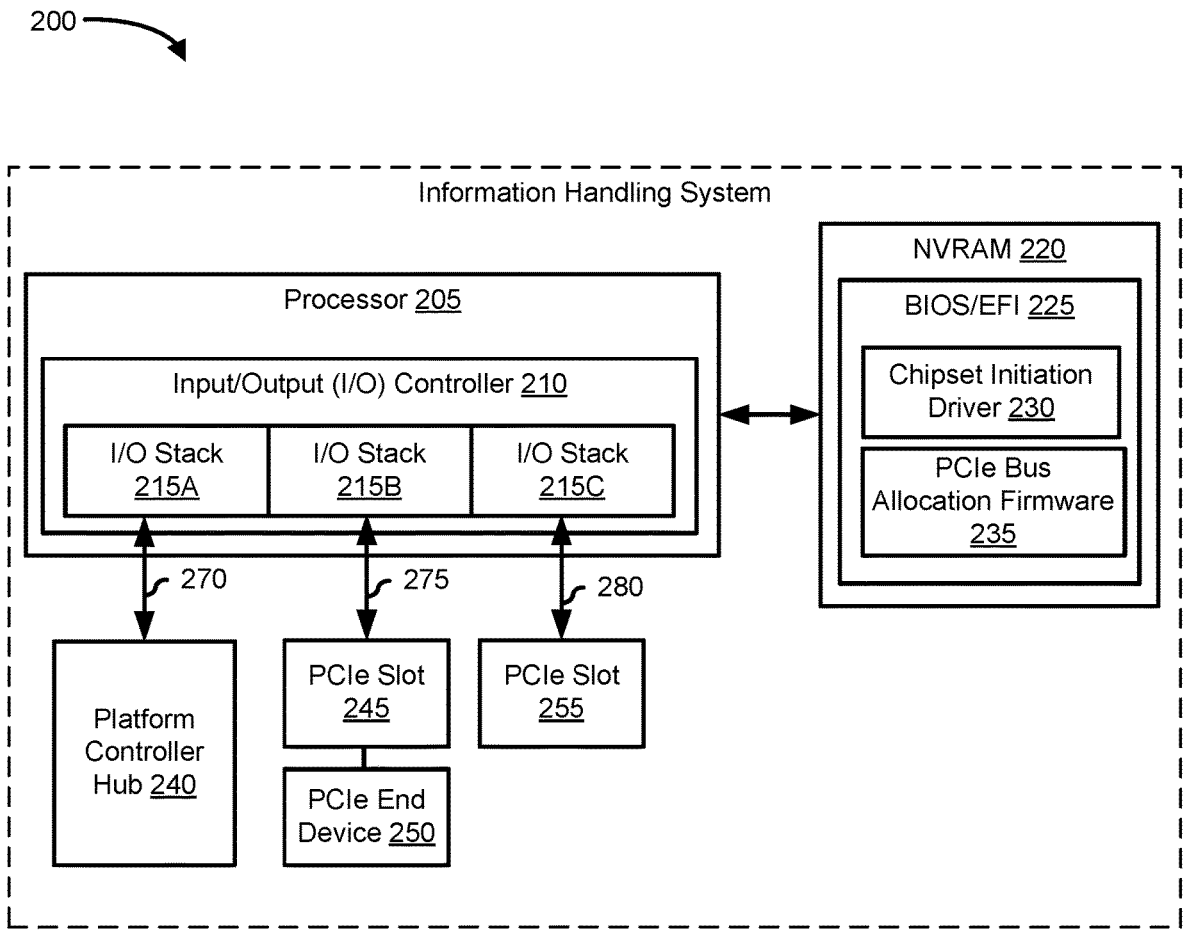
FIG. 2 is a block diagram illustrating an example of an information handling system for dynamic allocation of PCIe bus numbers, according to an embodiment of the present disclosure.

FIG. 2 shows an information handling system 200 for dynamically balancing PCIe bus numbers. Information handling system 200, which is similar to information handling system 100 of FIG. 1, includes a processor 205, an NVRAM 220, a PCH 240, a PCIe slot 245, a PCIe end device 250, a PCIe slot 255. Processor 205 includes an I/O controller 210 which includes I/O stack 215A-215C. PCH 240 is coupled to I/O stack 215A via a PCIe bus resource 270. PCIe slot 245 is coupled to I/O stack 215B via PCIe bus resource 275. PCIe slot 255 is coupled to I/O stack 215C via a PCIe bus resource 280. PCIe slot 245 is populated by PCIe end device 250 while PCIe slot 255 is unpopulated. NVRAM 220 includes a BIOS/EFI 225 which includes a chipset initiation driver 230 and a PCIe bus allocation firmware 235. The components shown are not drawn to scale and information handling system 200 may include additional or fewer components. In addition, connections between components may be omitted for descriptive clarity. Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip.

NVRAM 220 which is similar to NVRAM 140 of FIG. 1 may be configured to store BIOS/EFI 225 in addition to other software or firmware modules. BIOS/EFI 225 also referred to as BIOS 225 includes software and/or firmware modules for specifying hardware configuration settings, system date/time, boot sequence, etc. When information handling system 200 is initially powered on or rebooted, program instructions within BIOS 225 may be executed by processor 205 to configure hardware components of the information handling system, perform a power-on self-test (POST) to ensure that the hardware configuration is valid and working properly, discover and initialize devices, and launch a bootloader to load an operating system. Although, information handling system 200 is shown with one processor, information handling system 200 may include more than one processor.

Before the PCIe devices are detected and enumerated, BIOS 225 is executed to allocate various PCIe bus resources to one or more components of information handling system 200, such as processor 205, PCIe end device 250, and PCIe slots 245 and 255 at the start of POST. PCIe specification allows a maximum of two hundred and fifty-six bus numbers to be allocated to the PCIe devices included within a system. A bus number is a unique identifying number assigned to each PCIe bus or PCIe logical bus within its domain. In conventional information handling systems, the BIOS typically allocates a small number of bus numbers to core devices within the host processor and each PCI-to-PCI bridge in the system. BIOS 225 then distributes the remaining PCIe bus resources relatively evenly to the PCIe slots provided in the system motherboard.

However, a problem occurs when specialized PCIe cards such as a dual-port Thunderbolt™ card are connected to the PCIe slots. Distributing PCIe bus resources evenly among the PCIe slots may not allow enough bus resources to be allocated to the specialized PCIe cards, such as those with multiple PCI-to-PCI bridge devices on a single card or a complex hardware design. Because these PCIe cards require more bus resources than typical PCIe cards, they often fail to operate properly when bus resources are allocated evenly among the PCIe slots. For example, some specialized PCIe devices may require a minimum of sixty bus resources. However, a PCIe slot is typically allocated less than sixty bus resources. To overcome this issue, among others, the present disclosure provides embodiments of an improved system and method to dynamically allocate PCIe bus resources to a plurality of PCIe slots based on bus requirements.

For example, BIOS 225 may be configured to determine how many PCIe slots are in information handling system 200. In addition, chipset initiation driver 230 may be able to detect whether a PCIe slot is populated or unpopulated. In particular, chipset initiation driver 230 detect the value of a presence detect state (PDS) bit associated with a PCIe slot. The PDS bit indicates whether the PCIe slot is populated or not. For example, the PDS bit may be set to one if the PCIe slot is populated or to zero if the PCIe slot is unpopulated. Chipset initiation driver 230 may update the status of each PCIe slot in a PCIe bus configuration map to indicate whether the PCIe slot is populated or not based on the value of the PDS bit. The PCIe bus configuration map may show information of the mapping or association of the PCIe bus resources and/or I/O stacks to PCIe slots.

The PCIe bus allocation firmware 235 may then base the PCIe bus allocations at least in part on the status of the PDS bit in the bus configuration map. For example, if a PCIe slot is unpopulated, then the PCIe bus allocation firmware 235 may not allocate a PCIe bus resource to the PCIe slot. In another embodiment, PCIe bus allocation firmware 235 may allocate a previously determined minimum number of PCIe bus resources to unpopulated PCIe slots. For example, the minimum number of PCIe bus resources to be allocated to unpopulated PCIe slots may be three. In another example, the minimum number of PCIe bus resources to be allocated to unpopulated PCIe slot is one. BIOS may also disable unused root ports and corresponding clocks of the unpopulated PCIe slots resulting in power savings. BIOS 225 or PCIe bus allocation firmware 235 may generate a resource balancing information table, similar to table 2 below, that includes information regarding the PCIe bus allocation. Because the firmware of chipset initiation driver 230 is executed before the reference code, PCIe bus allocation firmware 235 may perform bus allocations can be performed without a reset which can also reduce rebalancing cycles.

Table 1 below shows a typical PCIe bus allocation. In this example, each CPU1-CPU4 may be allocated with sixty-four buses in total, with different allocations for each stack. With the current allocation, a customer who wants to use PCIe slot 5 and PCIe slot 12 for two PCIe devices that each require thirty-two PCIe buses may not be able to do so. This is because, PCIe slot 5 which is mapped to CPU4 stack 2 is allocated nineteen buses while PCIe slot 12 which is mapped to CPU3 stack 1 is allocated with nineteen buses. Thus, during the POST, the information handling system would run out of buses for the PCIe devices and the POST could not be completed.

TABLE 1

Current PCIe bus allocation

|  | Stack 0 | Stack 1 | Stack 2 | Stack 3 | Total |
|---|---|---|---|---|---|
| CPU1 | 22 | 14 | 14 | 14 | 64 |
| CPU2 | 7 | 19 | 19 | 19 | 64 |
| CPU3 | 7 | 19 | 19 | 19 | 64 |
| CPU4 | 7 | 19 | 19 | 19 | 64 |

Table 2 below shows an allocation based on the present disclosure. In this example, chipset initiation driver 230 may determine whether there is a PCIe device installed in each of the PCIe slots, that is whether the PCIe slot is populated or not. Accordingly, BIOS/EFI 142 may prioritize the allocation of PCIe bus numbers for populated PCIe slots. BIOS/EFI 142 may allocate fewer PCIe buses for unpopulated PCIe slots. A certain number of PCIe buses to be allocated for the unpopulated PCIe slots may be determined by the customer prior to POST. For example, a minimum of three PCIe bus resources may be allocated per stack.

The total PCIe bus resources allocated in table 2 are the same in table 1, which is two hundred fifty-six. PCIe bus allocation firmware 235 allocates fewer PCIe bus resources to unpopulated PCIe slots. In this example, PCIe slots associated with stack zero of CPU3 and CPU4 are unpopulated and are allocated three PCIe bus resources each. In addition, PCIe bus allocation firmware 235 allocates seventy-one PCIe bus resources to each of PCIe slots 5 and 12. This allocation is enough for each of the PCIe devices installed in these PCIe slots. Accordingly, because there are enough PCIe bus resources allocated, the POST can be completed. Furthermore, the customer can move the specialized PCIe device from one PCIe slot to another PCIe slot and during the reboot, BIOS 225 may dynamically adjust the allocation of PCIe bus resources based on the new location of the specialized PCIe device without manual intervention.

TABLE 2

New PCIe bus allocation

|  | Stack 0 | Stack 1 | Stack 2 | Stack 3 | Total |
|---|---|---|---|---|---|
| CPU1 | 16 | 5 | 5 | 6 | 32 |
| CPU2 | 3 | 11 | 9 | 9 | 32 |
| CPU3 | 3 | 71 | 11 | 11 | 96 |
| CPU4 | 3 | 11 | 71 | 11 | 96 |

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
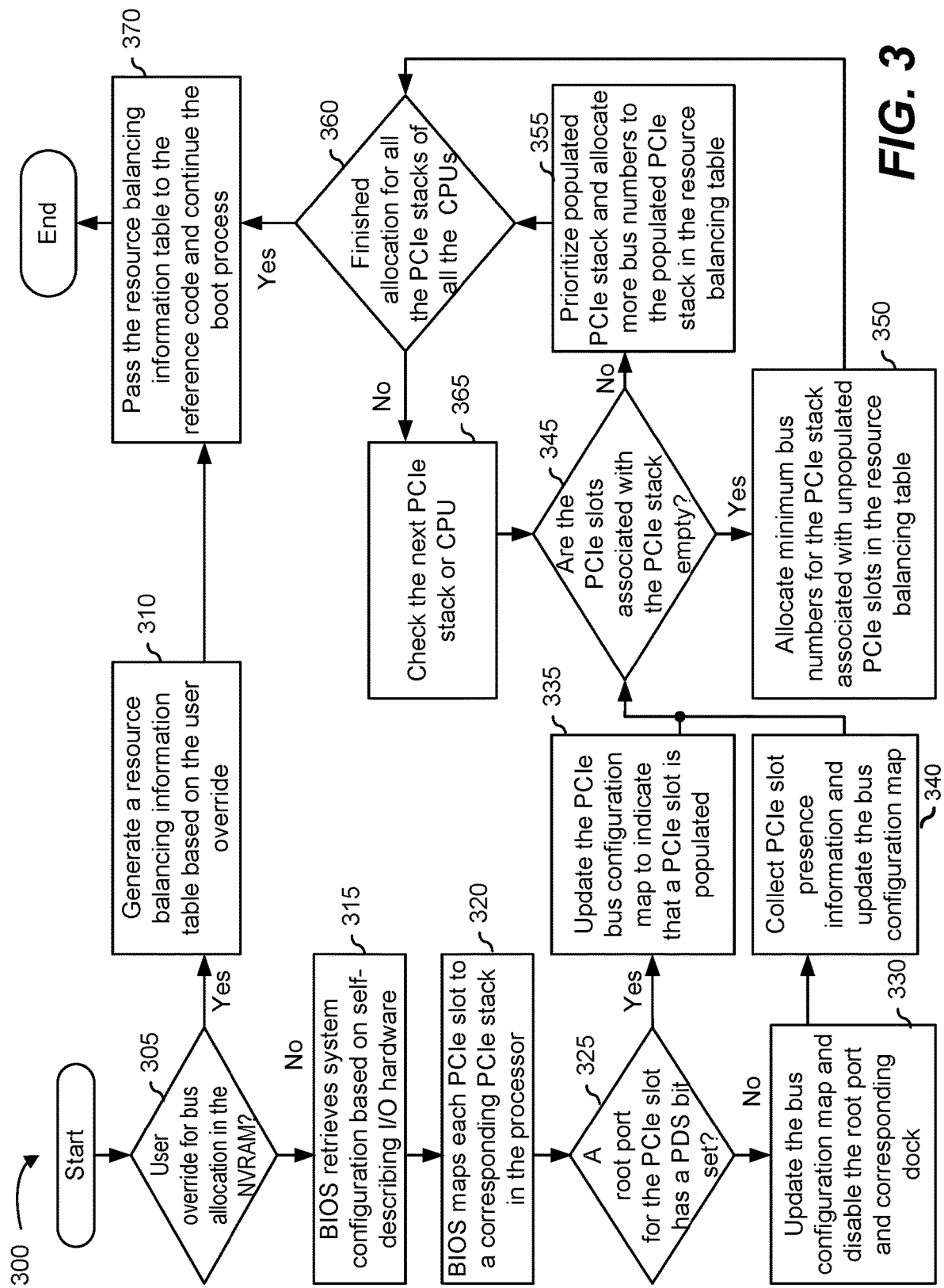
FIG. 3 is a flowchart illustrating an example of a method for dynamic allocation of PCIe bus numbers, according to an embodiment of the present disclosure.

FIG. 3 shows a method 300 for dynamically balancing PCIe bus resources. While embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

Method 300 typically starts at decision block 305, where it determines whether there is a user override for bus allocation in the NVRAM. The user override may include information and/or requirements of bus number allocation for specific PCIe slots. The user override may also include information on one or more specialized PCIe devices installed on particular PCIe slots. If there is a user override, then the "YES" branch is taken, and the method proceeds to block 310. If there is no user override, then the "NO" branch is taken, and the method proceeds to block 315 where the BIOS retrieves system configuration based on self-describing I/O hardware. At block 310, the method constructs a resource balancing information table, which may be similar to table 2, based on the user override. The resource balancing information table shows the allocation of PCIe bus resources to each of the PCIe slots which may be according to I/O stacks of each CPU, similar to table 2.

At block 320, the BIOS maps each PCIe slot to a corresponding PCIe also referred herein as I/O stack in the processor or CPU. At decision block 325, the method determines whether a root port associated with the PCIe slot has a PDS bit set. If the root port has a PDS bit set, then the PCIe slot associated with the root port is populated. Otherwise, the PCIe slot is unpopulated. If the root port for the PCIe slot has a PDS bit set, then the "YES" branch is taken, and the method proceeds to block 335. If the root port for the PCIe slot does not have a PDS bit set, then the "NO" branch is taken, and the method proceeds to block 330 where the method updates the bus configuration map and disables the root port. The method may also disable the corresponding dock. At block 335, because the PDS bit is set it means that there is a PCIe device installed in the PCIe slot. Accordingly, the method updates the bus configuration map to indicate there is a PCIe device in the PCIe slot.

At block 340, the method collects PCIe slot presence information and updates the bus configuration map to indicate that there is no PCIe device in the PCIe slot. The method proceeds to decision block 345, where the method determines whether the PCIe slots from the PCIe stacks are empty. If the PCIe slots from the PCIe stacks are empty, then the "YES" branch is taken, and the method proceeds to block 350 where the method allocates minimum bus numbers for the PCIe stack in the resource balancing table. If the PCIe slots from the PCIe stacks are not empty, then the "NO" branch is taken, and the method proceeds to block 355 where the method prioritizes the PCIe stack and allocates more bus numbers to the PCIe stack in the resource balancing table. In one example, the bus numbers allocated for the PCIe slots populated with specialized devices may be based on the number of the populated standard PCIe slots, PCIe slots populated with specialized devices, and/or unpopulated PCIe slots. The method may automatically perform calculations based on the available PCIe bus numbers prioritizing the PCIe slots with specialized devices, then the PCIe slots populated with standard PCIe devices, and lastly the unpopulated PCIe slots. The PCIe slots populated with specialized devices may be allocated with more bus numbers than the PCIe slots populated with standard PCIe devices. The unpopulated PCIe slots may be allocated with the fewest bus numbers.

At decision block 360, the method determines whether it has finished allocating bus numbers to all of the PCIe stacks from all the CPUs. If the allocation of bus numbers to the PCIe stacks is finished, then the "YES" branch is taken, and the method proceeds to block 370. If the allocation of bus numbers to the PCIe stacks is not finished, then the "NO" branch is taken, and the method proceeds to block 365 where the method checks the next PCIe stack and/or CPU and then proceeds to decision block 345. At block 370 the method may pass the resource balancing information to the reference code and continue to boot.

Although FIG. 3 shows example blocks of method 300 in some implementation, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a standalone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method performed at power-on self-test, the method comprising:
   detecting, by a processor, whether each one of a plurality of peripheral component interconnect express (PCIe) slots is populated or unpopulated;
   updating a PCIe bus configuration map to indicate whether each one of the PCIe slots is populated or unpopulated;
   allocating PCIe bus resources to each one of the PCIe slots based on the PCIe bus configuration map, wherein the allocating of the PCIe bus resources includes prioritizing populated PCIe slots over unpopulated PCIe slots; and
   disabling a root port associated with an unpopulated PCIe slot.

2. The method of claim 1, wherein the detecting whether each one of the PCIe slots is populated or unpopulated is based on a value of presence detect state bit associated with each of the PCIe slots.

3. The method of claim 1, further comprising disabling a clock associated with an unpopulated PCIe slot.

4. The method of claim 1, wherein the allocating of the PCIe bus resources includes generating a resource balancing table.

5. The method of claim 4, further comprising transmitting the resource balancing table to a reference code of a basic input/output system.

6. The method of claim 1, further comprising determining how many PCIe slots are included in an information handling system.

7. The method of claim 1, wherein the allocating of the PCIe bus resources includes allocating a minimum number of the PCIe bus resources to unpopulated PCIe slots.

8. An information handling system, comprising:
   a processor; and
   a memory device storing code that when executed causes the processor to perform operations, the operations including:
   detecting whether each one of a plurality of peripheral component interconnect express (PCIe) slots is populated or unpopulated;

updating a PCIe bus configuration map to indicate whether each of the PCIe slots is populated or unpopulated;

allocating PCIe bus resources to each of the PCIe slots based on the PCIe bus configuration map, wherein the allocating of the PCIe bus resources includes prioritizing populated PCIe slots over unpopulated PCIe slots: and disabling a clock associated with an unpopulated PCIe slot.

9. The information handling system of claim 8, wherein the detecting whether each of the PCIe slots is populated or unpopulated is based on a value of presence detect state bit associated with each of the PCIe slots.

10. The information handling system of claim 8, further comprising disabling a root port associated with an unpopulated PCIe slot.

11. The information handling system of claim 8, wherein the allocating of the PCIe bus resources includes generating a resource balancing table.

12. The information handling system of claim 11, further comprising transmitting the resource balancing table to a reference code of a basic input/output system.

13. The information handling system of claim 8, further comprising determining how many PCIe slots are included in the information handling system.

14. The information handling system of claim 8, wherein the allocating of the PCIe bus resources includes allocating a minimum number of the PCIe bus resources to unpopulated PCIe slots.

15. A non-transitory computer-readable media to store instructions that are executable to perform operations comprising:

detecting whether each of a plurality of peripheral component interconnect express (PCIe) slots is populated;

updating a PCIe bus configuration map to indicate whether each slot is populated;

allocating PCIe bus resources to each slot based on the PCIe bus configuration map, wherein the allocating of the PCIe bus resources includes prioritizing populated PCIe slots over unpopulated PCIe slots, wherein the allocating of the PCIe bus resources includes generating a resource balancing table; and transmitting the resource balancing table to a reference code of a basic input/output system.

16. The non-transitory computer-readable media of claim 15, wherein the detecting whether each of the PCIe slots is populated or unpopulated is based on a value of presence detect state bit associated with each of the PCIe slots.

17. The non-transitory computer-readable media of claim 15, the operations further comprising disabling a root port associated with an unpopulated PCIe slot.

18. The non-transitory computer-readable media of claim 15, the operations further comprising disabing a dock associated with an unpopulated PCIe slot.

19. The non-transitory computer-readable media of claim 15, wherein the operations further comprising mapping each PCIe slot to a corresponding PCIe stack.

20. The non-transitory computer-readable media of claim 15, the operations further comprising determining how many PCIe slots are included in an information handling system.

* * * * *